United States Patent
Cunha et al.

(10) Patent No.: US 11,535,257 B2
(45) Date of Patent: Dec. 27, 2022

(54) LANE LOCALIZATION SYSTEM AND METHOD

(71) Applicant: Robert Bosch GmbH, Stuttgart (DE)

(72) Inventors: Carlos Cunha, Mountain View, CA (US); Michael Ostertag, West Bloomfield, MI (US)

(73) Assignee: Robert Bosch GmbH, Stuttgart (DE)

( * ) Notice: Subject to any disclaimer, the term of this patent is extended or adjusted under 35 U.S.C. 154(b) by 233 days.

(21) Appl. No.: 16/882,068

(22) Filed: May 22, 2020

(65) Prior Publication Data

US 2021/0362723 A1   Nov. 25, 2021

(51) Int. Cl.
*B60W 40/06* (2012.01)
*G08G 1/14* (2006.01)

(52) U.S. Cl.
CPC .............. *B60W 40/06* (2013.01); *G08G 1/143* (2013.01); *B60W 2420/52* (2013.01); *B60W 2420/54* (2013.01); *B60W 2552/10* (2020.02); *B60W 2554/80* (2020.02)

(58) Field of Classification Search
CPC ............. B60W 40/06; B60W 2420/52; B60W 2420/54; B60W 2552/10; G08G 1/143; G08G 1/147; G01S 13/87; G01S 15/87; G01S 15/931; G01S 17/87; G01S 17/931; G01S 13/931

See application file for complete search history.

(56) References Cited

U.S. PATENT DOCUMENTS

| 5,574,426 A * | 11/1996 | Shisgal | G01S 15/931 340/904 |
| RE37,610 E * | 3/2002 | Tsuchiya | G05D 1/0251 348/42 |
| 6,828,903 B2 * | 12/2004 | Watanabe | G01S 13/931 348/148 |
| 6,898,527 B2 * | 5/2005 | Kimura | B62D 15/028 340/436 |
| 7,176,789 B2 * | 2/2007 | Herder | G01S 15/931 342/134 |
| 7,230,524 B2 * | 6/2007 | Watanabe | G01S 13/931 348/148 |
| 7,369,940 B2 * | 5/2008 | Frank | B60R 1/00 340/932.2 |
| 7,663,533 B2 | 2/2010 | Toennesen et al. | |
| 9,487,139 B1 * | 11/2016 | Ishida | B60W 50/16 |
| 9,542,845 B1 * | 1/2017 | Mayer | G01S 13/08 |
| 2005/0035879 A1 * | 2/2005 | Gotzig | B60Q 9/006 340/932.2 |
| 2005/0134440 A1 * | 6/2005 | Breed | G01S 17/931 701/45 |

(Continued)

*Primary Examiner* — Mussa A Shaawat
(74) *Attorney, Agent, or Firm* — Brooks Kushman P.C.

(57) ABSTRACT

A lane localization system and method that may include a first measurement distance sensor located on a right-hand side of a vehicle and a second measurement distance sensor located on a left-hand side of the vehicle. The system and method may also be operable to receive data from at least one of the first measurement distance sensor or the second measurement distance sensor. The system and method may further determine which lane along a road the vehicle is traveling within based on a comparison a frequency of one or more echoes indicative of one or more objects located on the right-hand side and the left-hand side of the vehicle.

20 Claims, 7 Drawing Sheets

(56) References Cited

U.S. PATENT DOCUMENTS

| | | | |
|---|---|---|---|
| 2006/0139181 A1* | 6/2006 | Danz | B60Q 9/007 |
| | | | 348/148 |
| 2007/0055412 A1 | 3/2007 | Bernhard | |
| 2008/0167819 A1* | 7/2008 | Breed | G08G 1/161 |
| | | | 701/300 |
| 2009/0157247 A1* | 6/2009 | Sjogren | B62D 1/28 |
| | | | 701/23 |
| 2014/0085112 A1* | 3/2014 | Gruteser | G06V 20/586 |
| | | | 340/932.2 |
| 2015/0284008 A1* | 10/2015 | Tan | B60W 10/04 |
| | | | 701/28 |
| 2016/0325753 A1* | 11/2016 | Stein | G05D 1/0251 |
| 2019/0019413 A1 | 1/2019 | Yun et al. | |
| 2019/0212749 A1* | 7/2019 | Chen | B62D 15/0255 |
| 2019/0258878 A1* | 8/2019 | Koivisto | G06V 20/584 |
| 2019/0315344 A1* | 10/2019 | Guibert De Bruet | B60W 10/18 |
| 2019/0384303 A1* | 12/2019 | Muller | G01C 21/3407 |
| 2020/0377080 A1* | 12/2020 | Kindo | G05D 1/0088 |
| 2021/0063578 A1* | 3/2021 | Wekel | G06K 9/6271 |
| 2021/0150230 A1* | 5/2021 | Smolyanskiy | B60W 60/0016 |
| 2021/0181350 A1* | 6/2021 | Zeng | G01S 7/4816 |
| 2021/0197858 A1* | 7/2021 | Zhang | B60W 50/0097 |
| 2021/0237753 A1* | 8/2021 | Kobayashi | B60W 30/18163 |
| 2021/0294944 A1* | 9/2021 | Nassar | G06F 11/3688 |
| 2022/0024475 A1* | 1/2022 | Tzempetzis | B60W 60/0011 |

* cited by examiner

LANE LOCALIZATION SYSTEM AND METHOD

TECHNICAL FIELD

The present disclosure relates to a lane localization using one or more distance measurement sensors.

BACKGROUND

Existing lane localization approaches generally rely on multiple sensors. And lane localization approaches typically process digital images acquired by video camera systems. Such camera systems may not always be available on vehicles. Or video camera systems may be cost prohibitive and may require specialized processing unites.

SUMMARY

A lane localization system and method is disclosed that comprises a first measurement distance sensor located on a right-hand side of a vehicle and a second measurement distance sensor located on a left-hand side of the vehicle. The first or second measurement distance sensor may include an ultra-sonic sensor, LiDAR sensors, or radar sensors. The system and method being operable to receive measurement data from at least one of the first measurement distance sensor or the second measurement distance sensor. The system and method may also detect one or more objects on the right-hand side of the vehicle or the left-hand side of the vehicle using the measurement data. The system and method may also generate one or more echo frequency response signals based on the measurement data and the one or more objects. The system and method may further compare the one or more echo frequency response signals to determine which lane along at least a two-lane road the vehicle is traveling.

The system and method may include a processor operable to receive data from at least one of the first measurement distance sensor or the second measurement distance sensor. The system and method may also be operable to determine which lane along a road the vehicle is traveling within based on a comparison a frequency of one or more echoes indicative of one or more objects located on the right-hand side and the left-hand side of the vehicle.

It is also contemplated that the system and method may be operable to determine one or more available parking locations available on the right-hand side and the left-hand side of the vehicle based on the comparison of the frequency of the one or more echoes. Based on the comparison, the system and method may also be operable to distinguish a given size and given shape of an object.

The system and method may also be operable to determine a number of lanes available along the road based on a clustering mixture model that is generated using previously stored data indicative of the frequency of the one or more echoes. The determination of the number of lanes may be performed based on a gaussian mixture model that is generated using previously stored data indicative of the frequency of the one or more echoes.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In recent years, lane localization has become of greater importance for both driver assistance operations (e.g., parking assist) and autonomous driving operations. While global positioning systems (GPS) may be used within a lane localization system, GPS alone may not be sensitive or robust enough to detect in which lane a vehicle may be traversing. To provide accurate detection to which lane a vehicle may be driving requires interpretation of many context clues (e.g., lane marking or location of other vehicles).

For instance, a lane localization system may combine data received from a global positioning systems (GPS), odometry, and one or more digital camera systems located around the periphery of a vehicle. The camera systems may acquire digital images of the terrain surround the vehicle. A vehicle controller may be operable to then execute an algorithm to process the received data to detect lane markings upon the road. The detected lane markings may be used to determine which lane the vehicle may be traversing or locations of available parking spaces. However, not all these sensors may be available on a given vehicle. In addition, these sensors may be costly to include within a vehicle and may further require specialized controllers (e.g., graphic processing units) to process the data.

It is therefore desirable to have a system and method that can be implemented in commercially available vehicles. The system and method may be operable upon existing controllers and sensor systems located within the vehicle. The available controller may be operable to implement a minimally complex algorithm that could operate with available sensors (e.g., Radar or LiDAR) and provide accurate lane detection assessments for use by non-safety-critical vehicle systems.

For instance, a lane localization system should be operable to detect one or more differences between the amount/quality of the information reaching sensors on the left vs. the right side of the vehicle. The lane localization system should be robust enough to detect such differences when the vehicle is driving on nearly any given street, regardless of the particular time of day.

The lane localization system may be operable to detect these differences by counting the "objects" from the left and right side of the vehicle through a stretch of road. The detection of objects may be used by a controller to determine what lane the vehicle is located within. It is contemplated that the controller may classify any "object" detected by distance measurement sensor including parked vehicles, oncoming/approaching traffic, curbs, trees, pedestrians, bicycles, etc. It is also contemplated that if the object detector is operable to classify objects or estimate some of properties such as length and height of the object, the lane localization system can be improved. The lane localization system may therefore be operable to count the number of objects, and not necessarily rely on visual lane marking detection, or other specific lane indicators.

Figure 1:
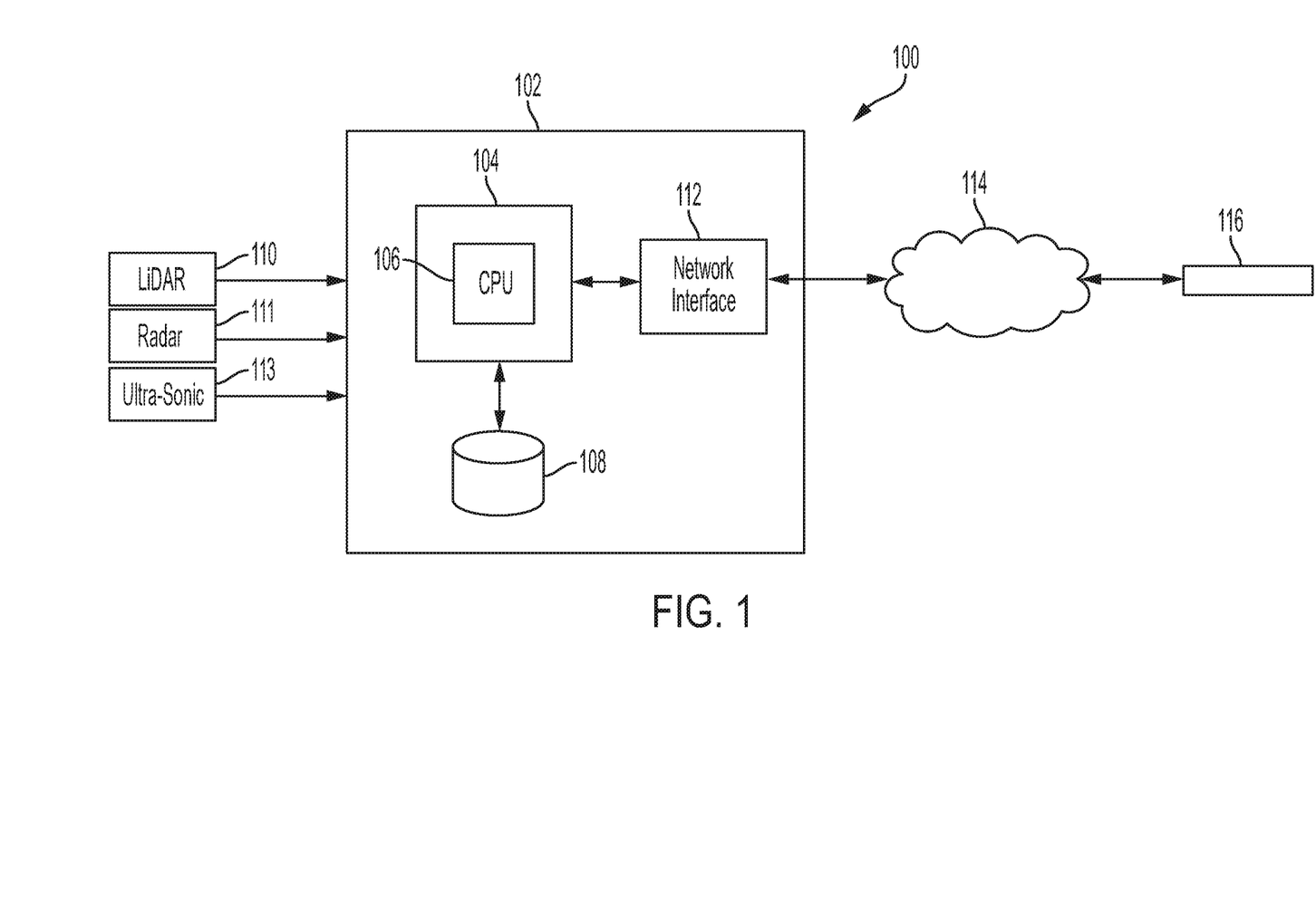
FIG. 1 illustrates an exemplary vehicle controller.

FIG. 1 illustrates an exemplary lane localization system 100 that may be employed within a vehicle. The system 100 may include at least controller 102. The controller 102 may include at least one processor 104 that is operatively connected to a memory unit 108. The processor 104 may be one or more integrated circuits that implement the functionality of a CPU 106 (i.e., central processing unit).

During operation, the CPU 106 may execute stored program instructions that are retrieved from the memory unit 108. The stored program instructions may include software that controls operation of the CPU 106 to perform the operation described herein. In some examples, the processor 104 may be a system on a chip (SoC) that integrates functionality of the CPU 106, the memory unit 108, a network interface, and input/output interfaces into a single integrated device. The processor 104 may implement an operating system for managing various aspects of the operation.

The memory unit 108 may include volatile memory and non-volatile memory for storing instructions and data. The non-volatile memory may include solid-state memories, such as NAND flash memory, magnetic and optical storage media, or any other suitable data storage device that retains data when the control system 100 is deactivated or loses electrical power. The volatile memory may include static and dynamic random-access memory (RAM) that stores program instructions and data.

The controller 102 may receive data from one or more distance sensors. For instance, the controller 102 may receive data from a light detection and ranging (LiDAR) sensor 110 operable to use light in the form of a pulsed laser that controller 102 may use to measure a distance, velocity (using a change in distance), rate of acceleration, or velocity of an approaching objects. Or, the controller 102 may receive measurement data from conventional radar sensors such as radar sensors 111 or short/medium/long-range radar sensors that are similarly operable to transmit pulsed signals that may be used by controller 102 for measuring ranges (distances) from objects. It is further contemplated that controller 102 may receive measurement data from ultrasonic sensors 113 that may be operable to send and receive ultrasonic pulses that relay back information about an object's proximity.

The controller 102 may include a network interface device 112 that is configured to provide communication with external systems and devices. For example, the network interface device 112 may include a wired and/or wireless Ethernet interface as defined by Institute of Electrical and Electronics Engineers (IEEE) 802.11 family of standards. The network interface device 112 may include a cellular communication interface for communicating with a cellular network (e.g., 3G, 4G, 5G). The network interface device 112 may be further configured to provide a communication interface to an external network 114 or cloud.

The external network 114 may be interconnected to the world-wide web or the Internet. The external network 114 may establish a standard communication protocol between one or more external computing devices 116. The external network 114 may allow information and data to be easily exchanged between computing devices 116 and the network interface 112. For instance, the external devices 116 may comprise one or more servers that are in communication with controller 102 via the external network 114. Or external devices 116 may include mobile devices (e.g., smart phone, smart watch) that are in communication with controller 102 via the external network 114.

Figure 2:
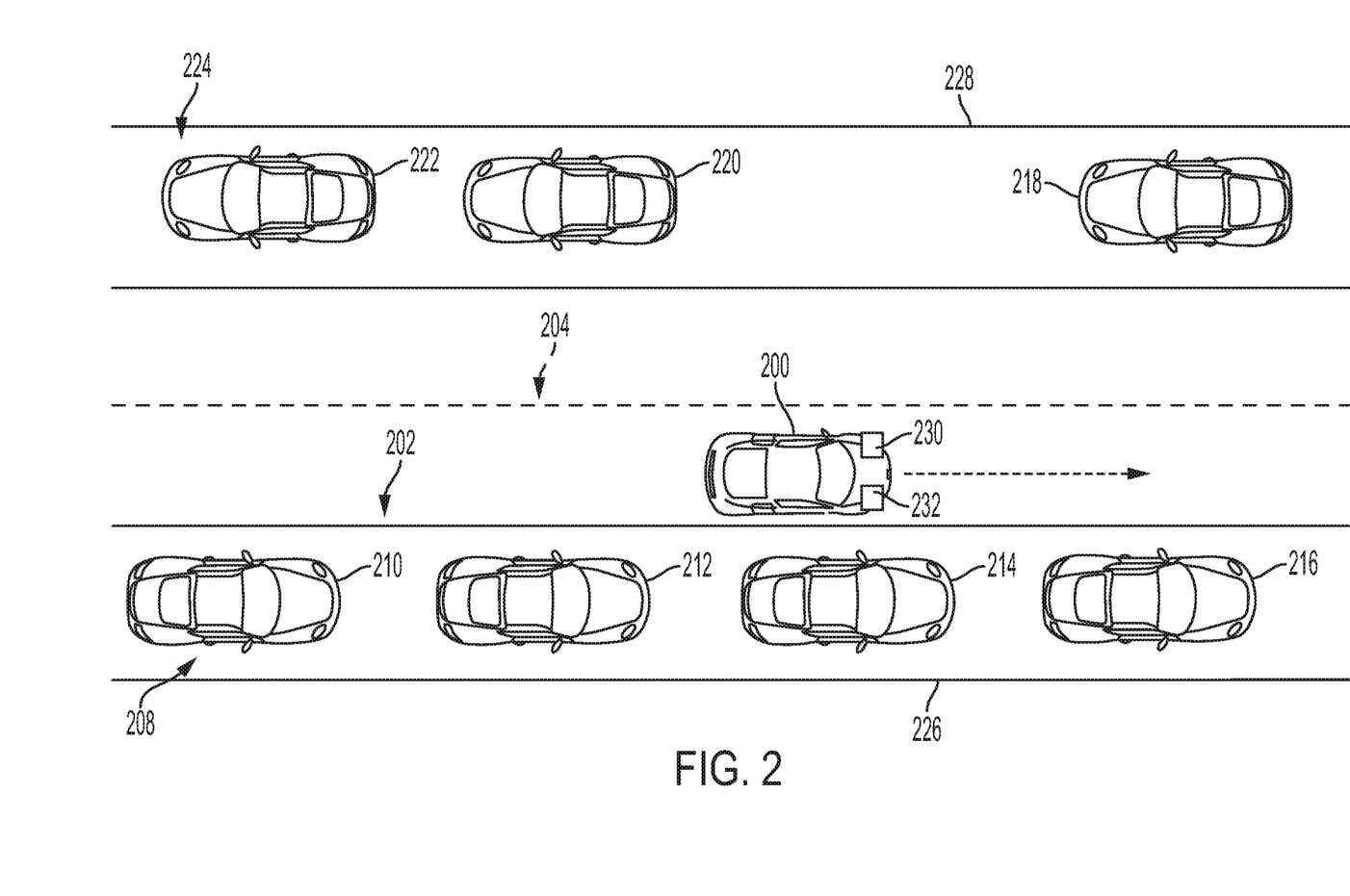
FIG. 2 illustrates a vehicle traveling down a two-lane road.

FIG. 2 illustrates a vehicle 200 traveling down a right lane 202 of a two-lane road that further includes a left lane 204. It is contemplated that vehicle 200 may be designed to include the controller 102 and the LiDAR sensor 110, radar sensor 111, or ultra-sonic sensor 113 illustrated in FIG. 1. Vehicles 210-216 may be parked along a right portion 208 of the two-lane road. Also, vehicles 218-222 may be parked along a left portion 224 of the two-lane road. It is also contemplated that a right-hand curb 226 may be located on the right portion 208 and a left-hand curb 228 may be located on the left portion 224 of the two-lane road.

While traveling down the two-lane road, data may be acquired from a distance sensor located on a left-hand side and a right-hand side of the vehicle 200. Again, distance sensors may include one or more LiDAR 110, radar sensor 111, or ultra-sonic sensor 113. FIG. 2 illustrates a left-hand sensor 230 that may be located along a left-hand side of the vehicle 200 and a right-hand sensor 232 that may be located along a right-hand side of the vehicle 200. The left-hand sensor 230 and the right-hand sensor 232 may be radar sensors operable to detect distance measurements. Controller 102 may receive these distance measurements and register echoes from any objects that are within a given distance (e.g., 0.3 to 5.0 meters) of the vehicle 200.

In FIG. 2, the controller 102 may receive data from the left-hand sensor 230 and the right-hand sensor 232 and be operable to determine the number (i.e., count) and distance of vehicles 210-216 and vehicles 222-218 (i.e., objects) while the vehicle 200 travels down lane 202. Controller 102 may also determine that there is a gap (i.e., a parking spot) located between vehicle 218 and 220. Controller 102 may be able to determine this information based on the number of echo's received from the sensors 230, 232.

Figure 3A:
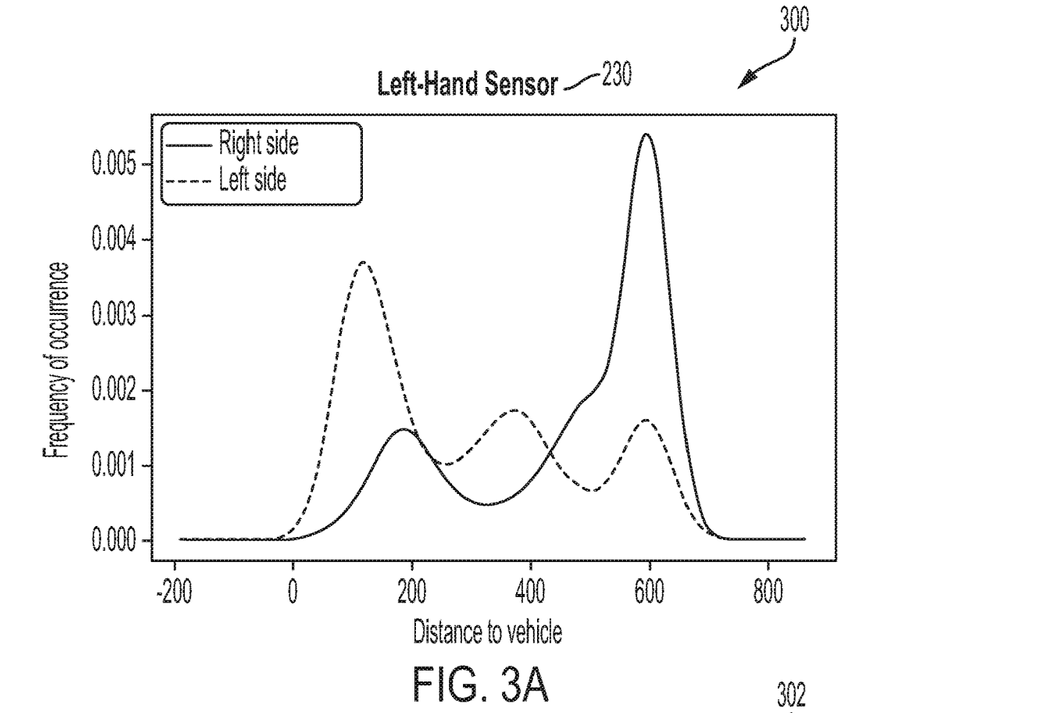
FIGS. 3A and 3B illustrates exemplary graphs generated by the vehicle controller using a left-hand side and right-hand side sensed distance measurements.
Figure 3B:
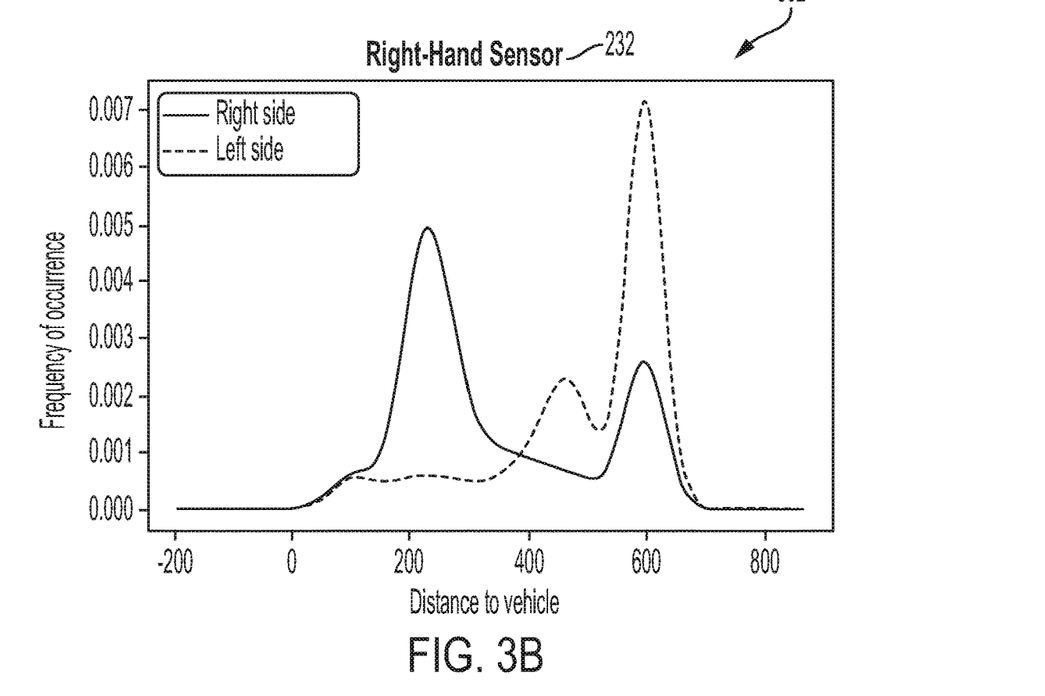

For instance, FIGS. 3A and 3B are a pair of graphs 300, 302 illustrating the frequency of occurrences (i.e., echoes) received by the left-hand sensor 230 and the right-hand sensor 232 while the vehicle 200 is driving down a left-side lane (e.g., lane 204) of a road. Both graphs 300, 302 also illustrate the distance of the object from the vehicle. It is contemplated that controller 102 may generate information illustrated by graphs 300, 302 based on data received from left-hand sensor 230 and the right-hand sensor 232. It is further contemplated that Note that, the counted echoes or objects may be a fractional amount—i.e., controller 102 may divide the absolute counts by total distance driven.

As shown, the left-hand sensor 230 may be operable to provide echoes for objects that may be present on both the right-hand side and the left-hand side of the vehicle 200. Likewise, the right-hand sensor 232 is operable to provide echoes for objects that may be present on both the right-hand side and the left-hand side of the vehicle 200. FIGS. 3A and 3B also illustrates that there is a greater number of echoes from objects detected on the right-hand side of the vehicle 200 than there are for the number of echoes from objects detected on the left-hand side of the vehicle 200. FIGS. 3A and 3B also illustrates that both the left-hand sensor 230 and the right-hand sensor 232 registered more occurrences of objects at a greater distance (i.e., 600) from the vehicle 200. Controller 102 may be operable to determine based on this information that vehicle 200 is traveling on the left-side lane 204 as opposed to the right-side lane 202.

Figure 4:
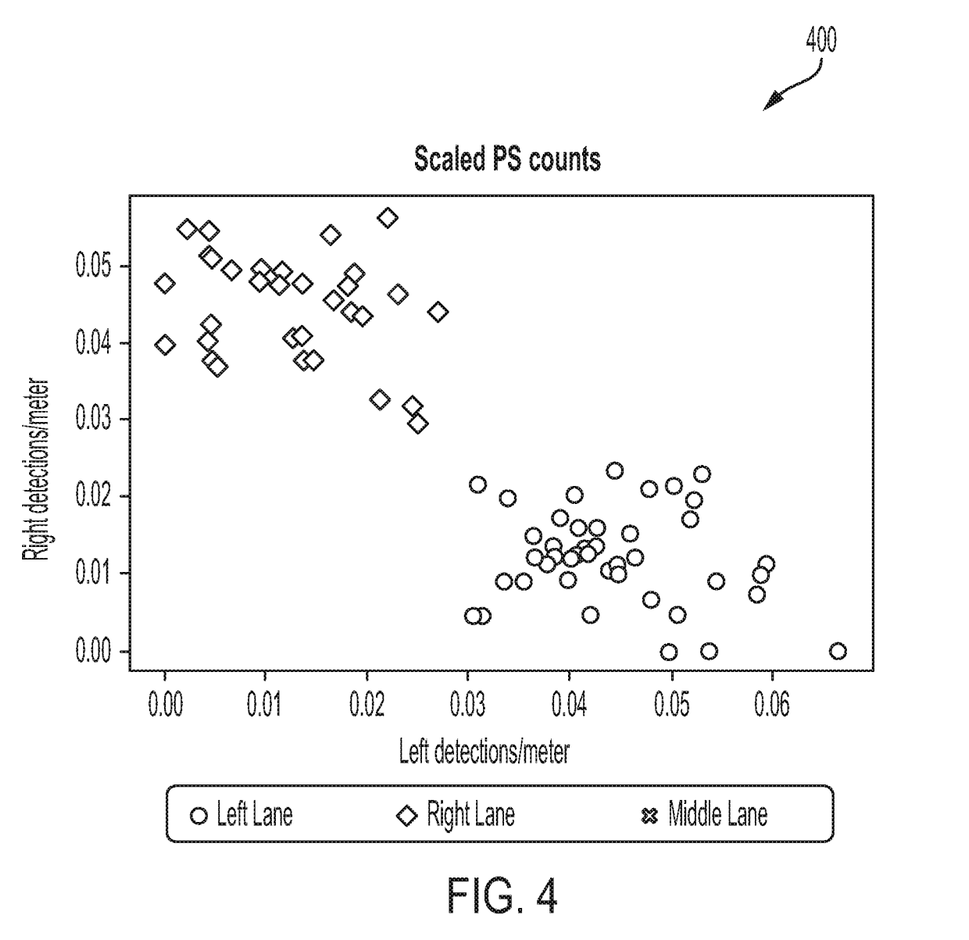
FIG. 4 illustrates another exemplary graph generated by the vehicle controller using sensed distance measurements.

With reference to FIG. 4, the echoes illustrated by graphs 300, 302 may be further processed by controller 102, as shown by graph 400, to generate information pertaining to the number of detected objects. Graph 400 illustrates the number of objects detected at a given distance (e.g., meters) on both the right-hand side and left-hand side of the vehicle 200. Controller 102 may determine the number of echoes may be dependent on which lane the vehicle is traveling within.

For instance, FIG. 4 illustrates that the number of echoes may correspond to potential parking spaces detected by the left-hand sensor 230 and the right-hand sensor 232. The data interpolated by controller 102 and illustrated by graph 400 illustrates that when the vehicle 200 is travelling along a right-hand side of the road (right-hand lane 204), more parking space candidates may be found on the right side of the road than on the left. Conversely, when the vehicle 200 is traveling along the left-hand side of the road (i.e., left-hand lane 202), controller 102 may determine there are more open parking locations on the left-hand side of the vehicle 200 than on the right-hand side.

Figure 5:
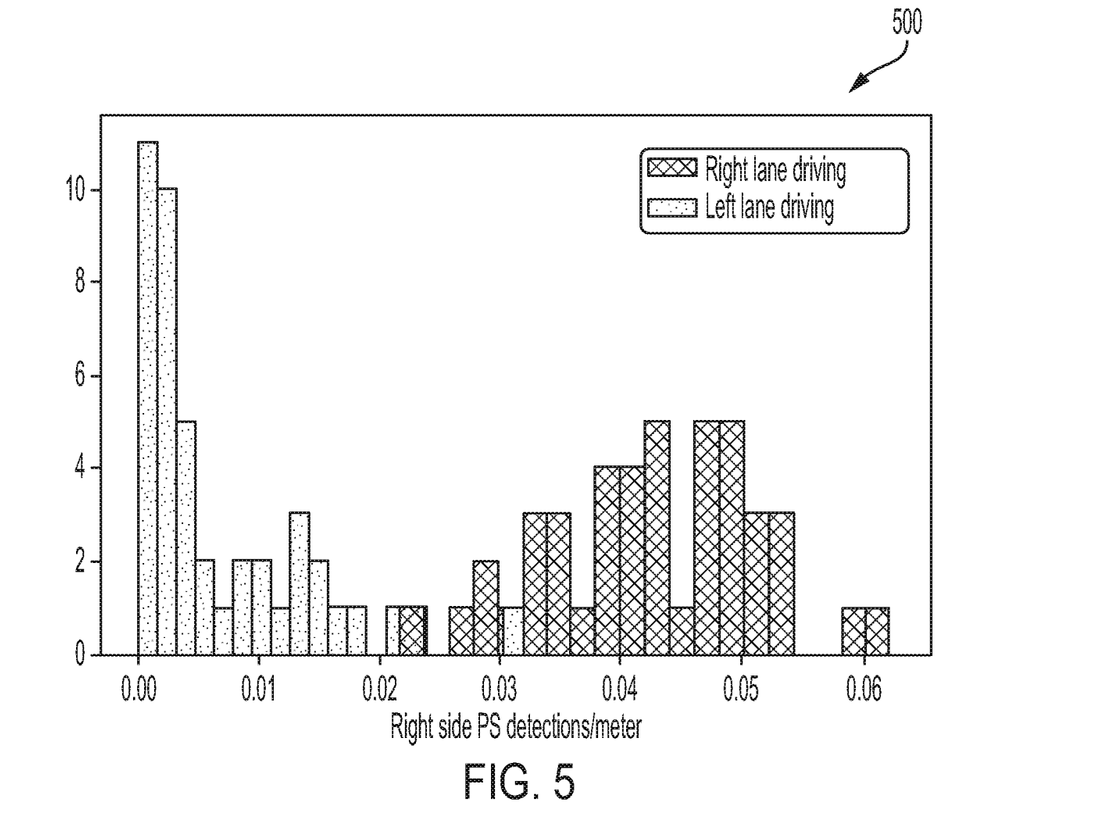
FIG. 5 illustrates another exemplary graph generated by the vehicle controller using sensed distance measurements from just a single sensor.

FIG. 5 illustrates a graph 500 where only the right-hand sensor 232 may provide data that controller 102 operably uses to determine the number of occurrences and distance for objects located on either the left-hand side or right-hand side of the vehicle 200. It is contemplated that the vehicle 200 may not include left-hand sensor 230, or that the left-hand sensor 230 may not be operational. It is contemplated that relying solely on the right-hand sensor 232, controller 102 may still accurately determine the number of objects on both the right-hand and the left-hand side to determine whether the vehicle 200 is driving on the right-side lane and on the left-side lane.

It is contemplated, however, that while controller 102 may accurately determine which lane the vehicle 200 is traversing using only one sensor (e.g., right-hand sensor 232) the overall accuracy in distinguishing which lane the vehicle 200 is traveling within is improved with additional sensors. For instance, when both the right-hand sensor 232 and the left-hand sensor 230 are used for classification, controller 102 may be operable to obtain approximately 99% accuracy whether the vehicle 200 is travelling in the right-hand lane or left-hand lane of a two-lane street.

It is further contemplated that controller 102 may be operable to determine the number of lanes (i.e., 2-lanes, 4-lanes) by aggregating historically stored data pertaining to the drives over a previously travelled road. For instance, vehicle 200 may travel along the same roadway to and from work each day. Controller 102 may use the data obtained from sensors 230, 232 to determine the lane used by the vehicle 200 while traveling between home and work. By determining which lane the vehicle 200 is traveling within, the controller 102 may also be operable to determine the overall number of lanes for a given roadway.

Figure 6:
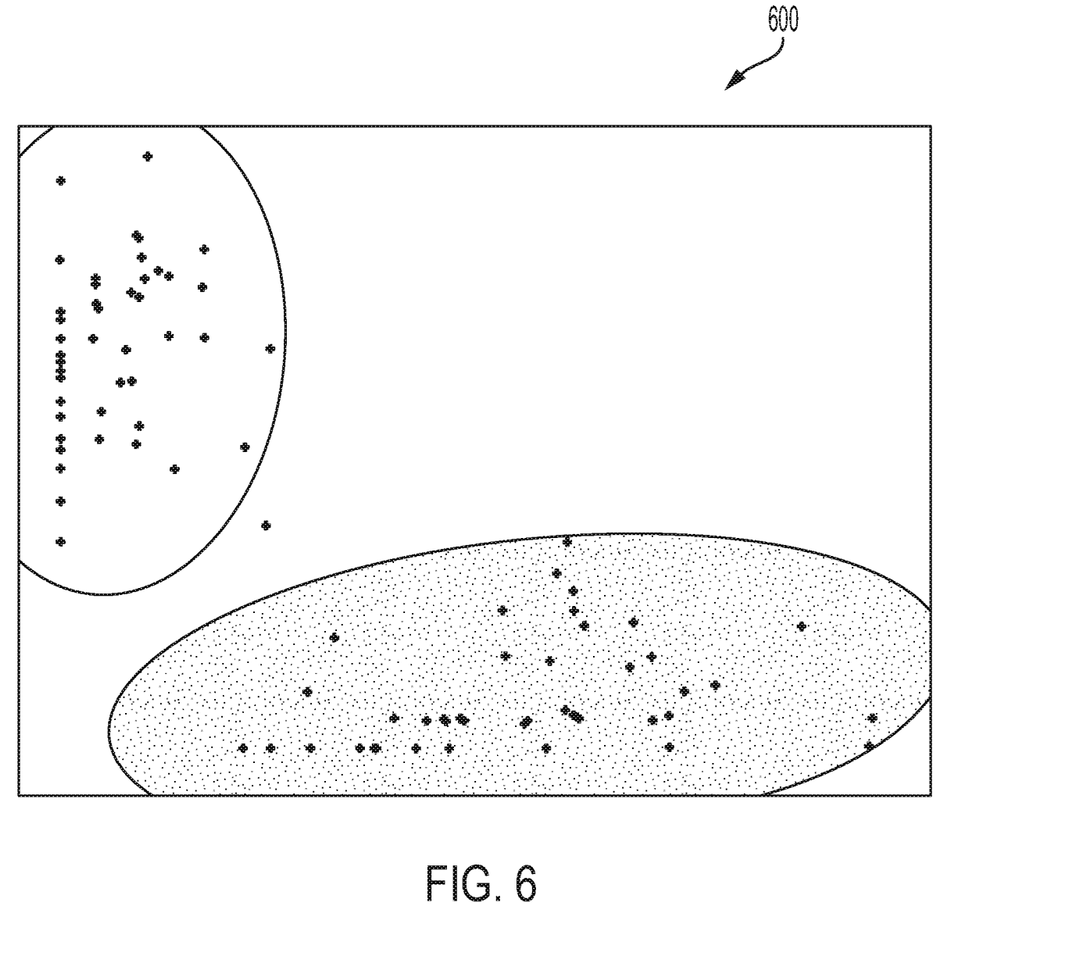
FIG. 6 illustrates another exemplary graph generated by the vehicle controller using sensed distance measurements.
Figure 7:
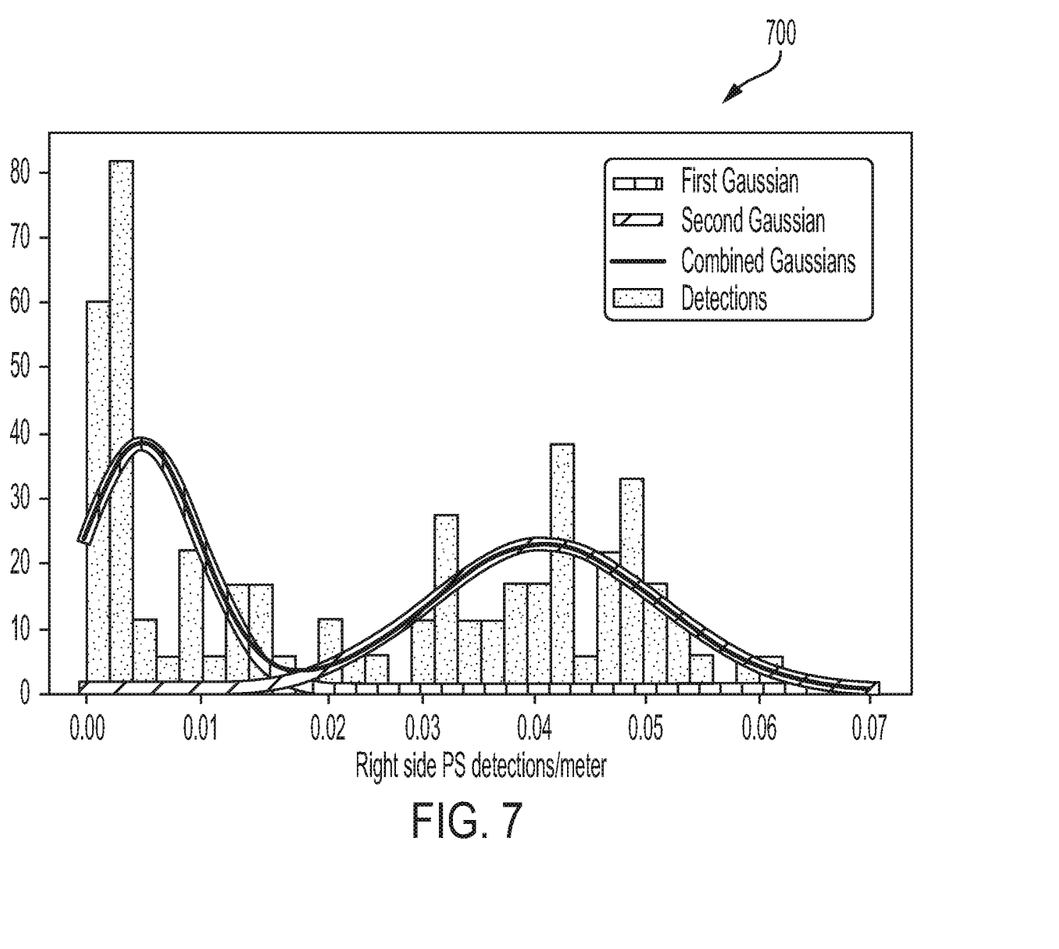
FIG. 7 illustrates another exemplary graph generated by the vehicle controller using sensed distance measurements.

For instance, FIG. 6 illustrates another exemplary graph 600 illustrative of information generated by controller 102 based on data received from sensors 130, 132. It is contemplated that if the total number lanes may not be known a priori, controller 102 may be operable to execute unsupervised learning techniques such as clustering and Gaussian mixture models to determine how many lanes are contained in a certain road segment. Graph 600 illustrates how controller 102 may automatically detect two lanes on an example street using Gaussian mixtures. FIG. 7 illustrates a further exemplary graph 700 illustrative of information generated by controller 102 based on data received from sensors 130, 132. Graph 700 illustrates similar data to that shown by graph 600. Graph 700, however, illustrates a situation where only the right-hand sensor 132 may be operably providing measurement data to controller 102.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A lane localization system, comprising:
a first measurement distance sensor located on a right-hand side of a vehicle and a second measurement distance sensor located on a left-hand side of the vehicle;
a processor operable to:
receive measurement data from at least one of the first measurement distance sensor or the second measurement distance sensor;
detect one or more objects on the right-hand side of the vehicle or the left-hand side of the vehicle using the measurement data;
generate one or more echo frequency response signals based on the measurement data and the one or more objects; and
compare the one or more echo frequency response signals to determine which lane along at least a two-lane road the vehicle is traveling.

2. The lane localization system of claim 1, wherein the processor is further operable to determine one or more available parking locations available on the right-hand side and the left-hand side of the vehicle based on comparing the one or more echo frequency response signals.

3. The lane localization system of claim 1, wherein the processor is further operable to distinguish a given size and given shape of an object based on the measurement data.

4. The lane localization system of claim 1, wherein the processor is further operable to determine a number of lanes available along the at least the two-lane road based on a clustering mixture model that is generated using previously stored data indicative of the one or more echo frequency response signals.

5. The lane localization system of claim 1, wherein the processor is further operable to determine a number of lanes available along the at least the two-lane road based on a gaussian mixture model that is generated using previously stored data indicative of the one or more echo frequency response signals.

6. The lane localization system of claim 1, wherein the first distance measurement sensor and the second distance measurement sensor are an ultra-sonic sensor.

7. The lane localization system of claim 1, wherein the first distance measurement sensor and the second distance measurement sensor are a radar sensor.

8. A lane localization method, comprising:
receiving measurement data from at least one of a first measurement distance sensor located on a right-hand side of a vehicle or a second measurement distance sensor located on a left-hand side of the vehicle;
detecting one or more objects on the right-hand side of the vehicle or the left-hand side of the vehicle using the measurement data;
generating one or more echo frequency response signals based on the measurement data and the one or more objects; and
comparing the one or more echo frequency response signals to determine which lane along at least a two-lane road the vehicle is traveling.

9. The lane localization method of claim 8, further comprising: determining one or more available parking locations available on the right-hand side and the left-hand side of the vehicle based on comparing the one or more echo frequency response signals.

10. The lane localization method of claim 8, further comprising: distinguishing a given size and given shape of an object based on the measurement data.

11. The lane localization method of claim 8, further comprising: determining a number of lanes available along the at least the two-lane road based on a clustering mixture model that is generated using previously stored data indicative of the one or more echo frequency response signals.

12. The lane localization method of claim 8, further comprising: determining a number of lanes available along the at least the two-lane road based on a gaussian mixture model that is generated using previously stored data indicative of the one or more echo frequency response signals.

13. The lane localization method of claim 8, wherein the first distance measurement sensor and the second distance measurement sensor are an ultra-sonic sensor.

14. The lane localization method of claim 8, wherein the first distance measurement sensor and the second distance measurement sensor are a LiDAR sensor.

15. A non-transitory computer-readable medium operable to employ a lane localization system, the non-transitory computer-readable medium having computer-readable instructions stored thereon that are operable to be executed to perform the following functions:
receive measurement data from at least one of a first measurement distance sensor located on a right-hand side of a vehicle or a second measurement distance sensor located on a left-hand side of the vehicle;
detect one or more objects on the right-hand side of the vehicle or the left-hand side of the vehicle using the measurement data;
generate one or more echo frequency response signals based on the measurement data and the one or more objects; and
compare the one or more echo frequency response signals to determine which lane along at least a two-lane road the vehicle is traveling.

16. The non-transitory computer-readable medium of claim 15, further comprising the following function: determine one or more available parking locations available on the right-hand side and the left-hand side of the vehicle based on comparing the one or more echo frequency response signals.

17. The non-transitory computer-readable medium of claim 15, further comprising the following function: distinguish a given size and given shape of an object based on the measurement data.

18. The non-transitory computer-readable medium of claim 15, further comprising the following function: determine a number of lanes available along the at least the two-lane road based on a clustering mixture model that is generated using previously stored the one or more echo frequency response signals.

19. The non-transitory computer-readable medium of claim 15, further comprising the following function: determine a number of lanes available along the at least the two-lane road based on a gaussian mixture model that is generated using previously stored data indicative of the one or more echo frequency response signals.

20. The non-transitory computer-readable medium of claim 15, wherein the first distance measurement sensor and the second distance measurement sensor are an ultra-sonic sensor.

* * * * *